United States Patent [19]

Alperin et al.

[11] Patent Number: 4,513,940
[45] Date of Patent: * Apr. 30, 1985

[54] MEANS AND METHOD FOR ATTACHING FAN AND FIXTURE UNITS OR THE LIKE SUBSTANTIALLY FLUSH WITH A CEILING

[75] Inventors: Marvin Alperin, Los Angeles; Joseph L. Brasswer, Tarzana, both of Calif.

[73] Assignee: Albrass Enterprises, Inc., Los Angeles, Calif.

[*] Notice: The portion of the term of this patent subsequent to Oct. 18, 2000 has been disclaimed.

[21] Appl. No.: 542,107

[22] Filed: Oct. 14, 1983

Related U.S. Application Data

[63] Continuation of Ser. No. 370,749, Apr. 22, 1982, Pat. No. 4,410,160.

[51] Int. Cl.³ .............................................. F16M 1/00
[52] U.S. Cl. ..................................... 248/674; 248/343
[58] Field of Search ............... 248/637, 342, 343, 344, 248/610, DIG. 6, 613, 327, 57, 674; 52/39

[56] References Cited

U.S. PATENT DOCUMENTS

| 180,365 | 7/1876 | Myers | 220/300 X |
|---|---|---|---|
| 1,089,497 | 3/1914 | Reed | 248/343 |
| 1,509,796 | 9/1924 | Tokuhisa | 220/300 |
| 1,549,618 | 8/1925 | Skoda | 220/300 X |
| 1,722,825 | 7/1929 | Roethel | 248/343 UX |
| 2,418,367 | 4/1947 | Pulvers | 220/300 X |
| 2,523,180 | 9/1950 | Anderson | 248/342 |

FOREIGN PATENT DOCUMENTS

| 955513 | 1/1957 | Fed. Rep. of Germany | 220/300 |
|---|---|---|---|
| 636625 | 4/1928 | France | 220/300 |
| 316726 | 8/1929 | United Kingdom | 220/300 |

*Primary Examiner*—J. Franklin Foss
*Attorney, Agent, or Firm*—Freilich, Hornbaker, Rosen & Fernandez

[57] ABSTRACT

An arrangement for attaching a fan-fixture unit substantially flush with a ceiling includes first and second bowl shaped circular members with cylindrical rims. One of the members is fixedly attached to the ceiling electrical outlet box and the other to the top of the fan-fixture unit. One of the members includes a plurality of uniquely shaped slots and the other member a plurality of support rods, each accommodatable in a slot. To attach the unit, it is raisable by a single operator until the support rods are in the slots. Thereafter, the unit is rotatable and released, resulting in the rods being locked securely within particularly shaped portions of the slots.

2 Claims, 14 Drawing Figures

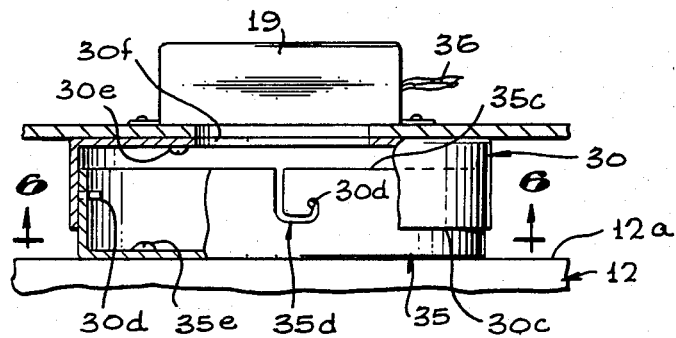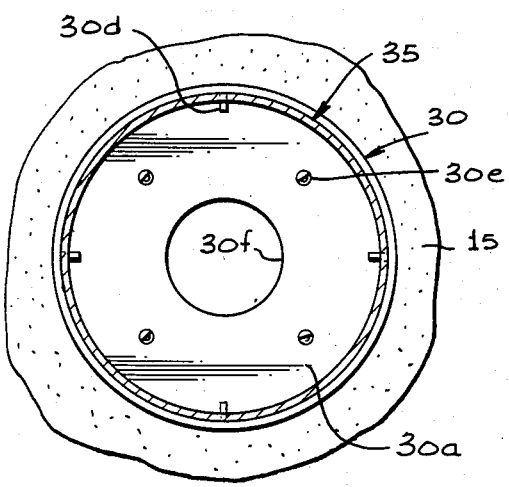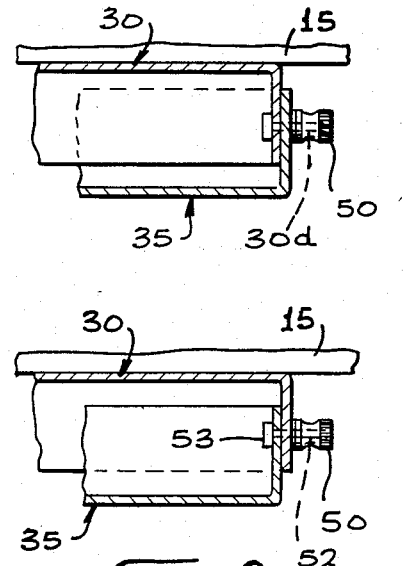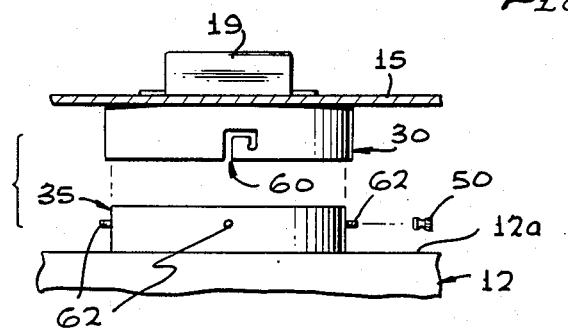

MEANS AND METHOD FOR ATTACHING FAN AND FIXTURE UNITS OR THE LIKE SUBSTANTIALLY FLUSH WITH A CEILING

This is a continuation of application Ser. No. 370,749 filed Apr. 22, 1982, now U.S. Pat. No. 4,410,160.

FIELD OF THE INVENTION

The present invention generally relates to fixture attachment devices and, more particularly, to an arrangement and method of attaching and supporting a relatively heavy fixture, substantially flush from a ceiling.

DESCRIPTION OF THE PRIOR ART

Various arrangements are being used to attach and support a fixture from a ceiling of a room, or the like. For example, a light fixture is supportable from a ceiling by known devices from the electrical outlet box in the ceiling. Such devices often consist of a chain or post which is mechanically attached to the box. For aesthetic purposes, a cover plate is used to enclose the box through which the chain or post extends.

Recently, the ceiling suspended multi-blade fans, hereafter simply referred to as fans, which were very popular years ago, have come back into vogue. The present fans are highly ornate, with a relatively-large diameter metallic housing, covering the fan motor, and with fanning blades. To further enhance their appearance and to provide them with additional functions most present day fans incorporate light fixtures, so that only one outlet box in the ceiling is needed to electrically connect both the fan motor and the light fixtures. The light fixtures typically extend downwardly below the blades. For aesthetic purposes, and to provide sufficient illumination, the light fixtures include an array of bulb sockets with their respective ornate covers or globes.

Typically, a fan with light fixtures extending downwardly therefrom, hereafter also referred to as the fan-fixture unit, is secured from the ceiling by means of a cylindrical post which is connected at one end to the top of the fan-fixture unit which is usually the top of the motor housing and at the other end to the outlet box, similar to the manner in which some conventional fixtures are fastened. The use of such a post, which is typically several inches long, e.g. 5 or more inches, greatly increases the distance from the ceiling to the lowest fixture's shades. Consequently, when the post is used, quite often, the lowest parts of the fan-fixture unit are suspended too low from the ceiling, from a safety point of view as well as for aesthetic reasons.

This problem can be overcome by eliminating the post and by mounting the top of the fan motor housing as close to the ceiling as possible, that is, substantially flush. As used herein, the term "substantially flush" is intended to mean that the top of the fan-fixture unit is very close to the ceiling, on the order of very few inches, e.g. two inches or less. However, such fan-fixture unit mounting cannot be achieved with presently known fixture or fan mounting arrangements. The diameter of the fan motor housing, on the order of 10 to 12 inches, is considerably larger than that of the outlet box in the ceiling, which is typically 3 to 4 inches. Thus, it is difficult to attach the top of the large-size housing to the outlet box when the housing top is very close to the ceiling. Also, it should be pointed out that since the weight of a fan-fixture unit is relatively great, on the order of 30 pounds or more, the unit must be attached very securely to support the heavy unit. Furthermore, since the fan includes a driven motor to turn the blades, vibration is unavoidable. Therefore, any attachment of the unit to the ceiling must be very tight to avoid any accidental detachment of the unit from the ceiling due to the vibrations. Furthermore, since the fan blades are relatively long, thus greatly increasing the effective width of the fan-fixture unit and due to its relatively great weight, it is practically impossible for one person to raise the unit to the ceiling and once raised, attach it substantially flush thereto, yet very securely, with known fastening arrangements, while holding on to the unit in the raised position.

OBJECTS AND SUMMARY OF THE INVENTION

It is a primary object of the present invention to provide a new arrangement for securely attaching a relatively heavy device to an outlet box in a ceiling so that the top of the device is substantially flush with the ceiling.

Another object of the present invention is to provide an arrangement with which a fan-fixture unit is easily, yet securely, attached to the ceiling outlet-box with the top of the unit substantially flush with the ceiling.

A further object of the present invention is to provide a new arrangement, adapted to enable a single person to securely attach a reasonably heavy fan-fixture unit to the ceiling outlet box so that the unit's top is substantially flush with the ceiling.

Yet, a further object of the invention is to provide a new method of securely attaching a fan-fixture unit so that its top is substantially flush with the ceiling.

These and other objects of the present invention are achieved by providing an attaching arrangement, one embodiment of which will be described in connection with a fan-fixture unit. The arrangement includes one part or member which is first attached to the outlet box, prior to attaching the fan-fixture unit. This member, hereafter also referred to as the box member, may be fixedly attached to the outlet box by threading bolts into the typically available threaded holds in the box. In one embodiment, the box member includes a plurality of support elements which extend slightly below the ceiling and parallel thereto. The arrangement also includes a second member which is fixedly attached to the top of the fan-fixture unit, before any attempt is made to attach the unit to the ceiling. This second member, which hereafter will be the unitmember, defines a plurality of recesses or slots equal in number to the support elements. The slots are designed with unique shapes and are spaced, so that when the fan-fixture unit is raised to the ceiling, the support elements of the box member enter these slots, thereby enabling the unit to be raised closer to the ceiling. The slots due to their unique shapes, enable the entire fan-fixture unit to be slightly rotated while the support elements are in their recesses. Once the unit has been rotated, it remains suspended from the ceiling. Thus, the single operator or person can let go of the unit and then secure the two members together. In a preferred embodiment, the slots are shaped so that after the unit is rotated and is released by the operator, the unit, due to its weight, moves downwardly a very short distance, thereby causing the support elements to become locked within specially-designed portions of the slots.

BRIEF DESCRIPTION OF THE DRAWINGS

FIGS. 3-6 are different views useful in explaining one embodiment of the invention; and FIGS. 7-9 are views useful in explaining additional embodiments of the invention.

DETAILED DESCRIPTION OF THE DRAWINGS

Figure 1:
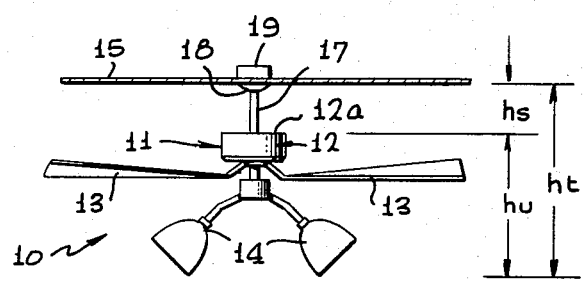
FIG. 1 is a side view of a fan-fixture unit suspended by prior art means.
Figure 2:
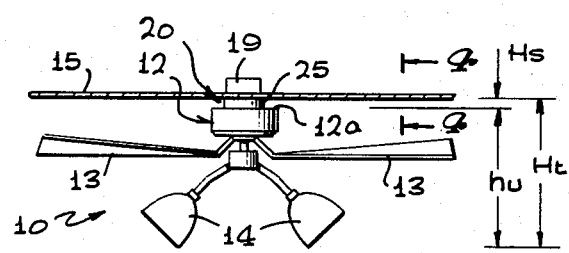
FIG. 2 is a side view of a fan-fixture unit suspended substantially flush with the ceiling with the novel arrangement of the present invention.

In order to first explain the advantages, realizable with the present invention, attention is first directed to FIGS. 1 and 2. FIG. 1 is a side view of a typical prior art fan-fixture unit 10 comprising a fan 11 which includes a fan motor housing 12 within which the fan-motor is housed. The fan also includes rotatable blades 13. An array of light fixtures, designated by 14, are shown extending downwardly from the fan. Different combinations of particular fan motor housings blades and fixture arrays can be provided to accommodate the aesthetic tastes of potential customers. The total height of the fan-fixture unit is designated by $h_u$.

In the prior art, the unit 10 is typically suspended from a ceiling 15 by a relatively long post 17. Typically, a cover plate 18 is used to enclose and cover the electrical outlet box 19 (see FIG. 4) in the ceiling. The height or distance between the ceiling 15 and the housing top 12a is designated by $h_s$. Typically, post 17 is on the order of 5 inches or more. The height $h_u$ of the fan-fixture unit is considerable, generally on the order of 17 inches or more. Thus, the total height $h_t = h_s + h_u \geq 5 + 17 \geq 22$.

Such a height has been found to be too great in many applications. The fixtures 14 tend to hang too far away from the ceiling, i.e. too low for aesthetic purposes. Also, tall people are likely to accidentally bump into the fixtures, and thus are subject to injury as well likely to cause damage to the unit.

These disadvantages can be overcome by eliminating the fixtures. However, this is unacceptable. Another manner of overcoming the disadvantages of the prior art is by supporting the fan-fixture unit 10 substantially flush with the ceiling 15 by means of a support arrangement of minimal height, e.g. two inches or less. Such an arrangement to which the present invention is directed is shown in FIG. 2 wherein the support arrangement is designated by 20 of a minimal height $H_s$. Thus, the total height of the support arrangement 20 together with the height of unit 10 is $H_s h_u = H_t$ where $H_t < h_t$. Since $H_s$ is smaller than $h_s$, the fan-fixture unit 10 is supported close enough to the ceiling 15 to avoid the disadvantages of the prior art.

At first blush, it may seem that attaching the fan-fixture unit 10 substantially flush with the ceiling 15 is a simple task. In practice, however, this is not the case. Typically, the motor housing 12 is generally quite large on the order of about 10 to 12 inches in diameter, while the outlet box 19 is much smaller, typically 3-5 inches. Thus, if one were to raise the unit 10 very close to the ceiling for flush mounting, there is not sufficient room between the housing top 12a and the outlet box 19 for one to secure the unit to the box. Furthermore, when the unit 10 is substantially flush with the ceiling, due to the large diameter housing 12, one cannot see between them, to use conventional screws and nuts to attach the unit very securely to the box. The attachment must be very tight to prevent any accidental detachment due to the continuous vibrating motion of the fan. The problem is further complicated by the fact that the unit 10 is relatively heavy as previously pointed out, typically weighing 30 pounds or more.

All of the above-described disadvantages and problems are overcome by the present invention. One embodiment of the invention will be described in conjunction with FIGS. 3-6. Other embodiments will be described in connection with the remaining figures.

Figure 3:
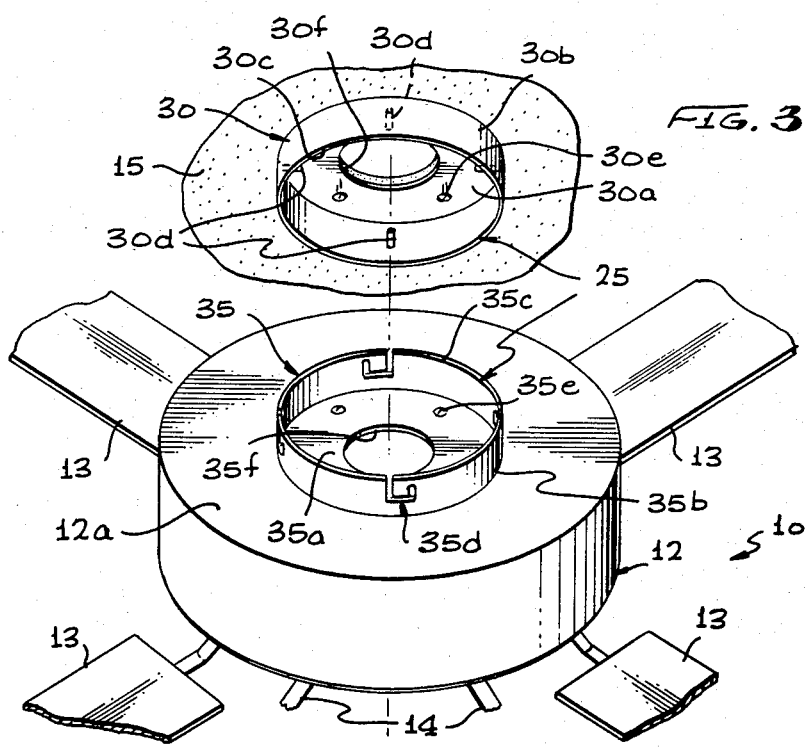
Figure 5A:
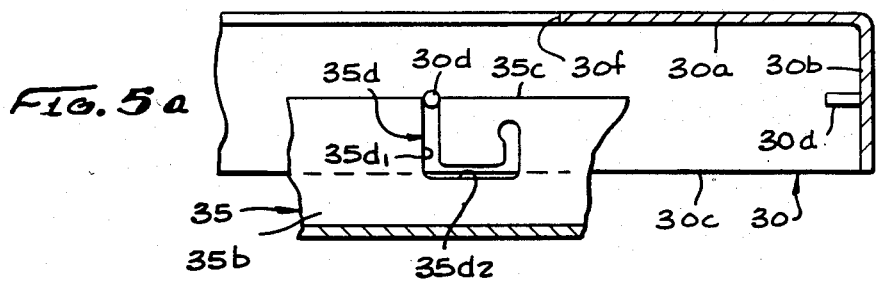
Figure 5B:
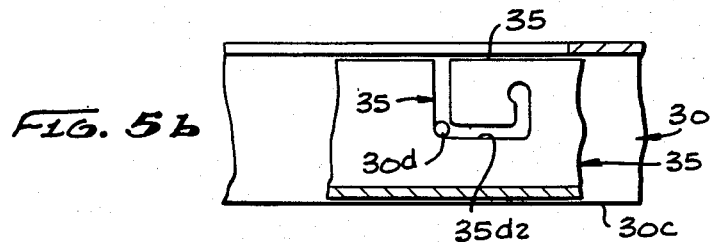
Figure 5C:
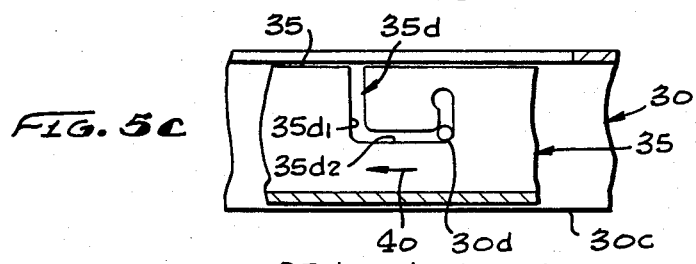
Figure 5D:
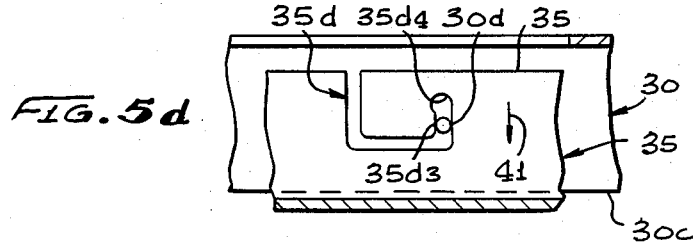
Figure 5E:
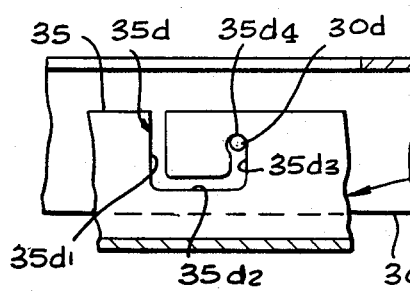
Figure 5F:
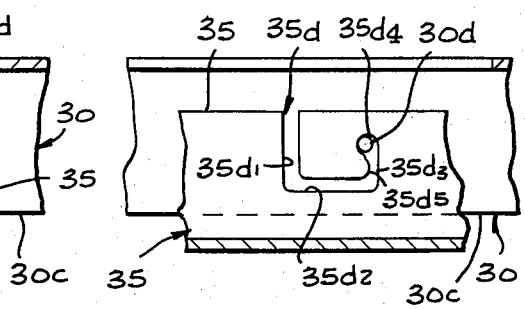

The novel attachment arrangement is shown in expanded isometric view in FIG. 3 and in partial side and cross sectional view in FIG. 4, as viewed along lines 4—4 in FIG. 2. The attachment arrangement 25 comprises two bowl-shaped members 30 and 35. Member 30 is shown attached to the ceiling 15 and as herebefore defined, it will also be referred to as the ceiling member. Member 35 is attached to the housing top 12a, and as herebefore defined, it will also be referred to as the unit member.

Ceiling member 30 is essentially in the shape of a circular bowl with a disc-shaped bottom 30a, a cylindrical rim 30b, of a height nearly equal to $H_s$, terminating in an outer lip 30c. Extending inwardly from the cylindrical rim 30b are a plurality of equally spaced support members or rods 30d. They may be formed from steel or brass in the form of short rods of a selected diameter e.g. 0.25 inch or less. As will be appreciated from the following, it is these rods which support the fan-fixture unit from the ceiling.

The member bottom 30a is fixedly secured to the outlet box 19 in the ceiling by a plurality of threaded screws 30e. Typically, the member bottom 30a has an opening 30f to provide access to the electrical wires 36 (see FIG. 5) which extend into the box. In FIG. 3, four equally spaced support rods are shown, for explanatory purposes. In practice, more or fewer than four support rods may be used. The ceiling member 30 is first fixedly secured to the ceiling 15 before any attempt is made to attach the unit 10.

The unit member 35 is very similar to that of ceiling member 30 except that it is attached first to the top 12a of the housing 12. Unit member 35 is also in the shape of a cylindrical bowl with a bottom 35a, from which a cylindrical rim 35b extends, terminating in an outer lip 35c. It is fixedly attached to the housing top 12a by screws or the like, designated 35e, and has an opening 35f in its bottom 35a to provide access for the electrical wires 36 from the fan-fixture unit 10. However, instead of the support rods 30d in ceiling member 30, the unit member 35 includes a plurality of uniquely-shaped slots or cavities 35d which extend partially downwardly from openings in lip 35c.

The slots 35d are equally spaced and equal in number to the number of the support rods. The diameters of rims 30b and 35b are chosen so that the outer diameter (O.D.) of one, e.g. rim 35b is slightly smaller than the inner diameter (I.D.) of the other rim 35b. Thus, the two members can extend into one another. In the particular example, it is unit member 35 which is extendable into ceiling member 30.

Attention is now directed to FIG. 5 in connection with which the novel shape of each of slots 35d and the advantages realized therefrom will be explained. After the two members 30 and 35 are fixedly attached to the outlet box 19 and housing top 12a, respectively, and the wires are interconnected, the fan-fixture unit 10 is ready to be mounted, a task easily accomplishable by one operator.

As the unit is raised, the rim 35b of base member 35 extends into the ceiling member 30, since the latter's ID is greater than the OD of the former. Each uniquely shaped slot 35d (see FIG. 5) has a first portion $35d_1$, which extends downwardly from the rim lip 35c. The slot portion $35d_1$ is wide enough to enable any support member 30d to pass therethrough. As the unit is raised and the support rods 30d abut lip 35c of the rim 30b of base member 35, the operator merely turns the unit 10 to align each support rod 30d with the mouth or opening of a slot 35d, as shown in FIG. 5, line a. Once the rods and slots are aligned, the unit 10 can be raised further, thus raising the base member 35 closer to the ceiling 15 within member 30. As a result, each support rod extends deeper into the slot portion $35d_1$, until it reaches the bottom thereof as shown in FIG. 5, line b. Extending from the bottom end of slot member $35d_1$ is a horizontal slot portion $35d_2$. Once the rods 30d are at the bottom ends of slot portions $35d_1$, due to the presence of slot portions $35d_2$, the operator can turn the entire fan-fixture unit 10 slightly about its longitudinal axis, as indicated by arrow 40 in FIG. 5, line c, and by FIG. 6, which is a view along lines 6—6 in FIG. 4. By turning the unit, each support rod 30d is effectively located within slot portion $35d_2$ away from the bottom end of slot portion $35d_1$, and particularly away from the slot opening at the lip 35c.

At this point, if the operator were to let go of the fan-fixture unit 10, it would not fall down, since the rods 30d are inside slot portions $35d_2$ and therefore cannot slide out of the base member 35 through the open ended slot portions $35d_1$. Thus, even at this point in the mounting procedure, the fan-fixture unit 10 is fully suspended, and therefore an operator need no longer hold it up. If one wanted to, one can at this point, (when the rods are at the ends of slot portions $35d_2$, which are remote from slot portions $35d_1$, as shown in FIG. 5, line c) use appropriate means to further secure the two members together, to avoid accidental detachment, due to fan vibrations. For example, pretapped holes in member 35 with predrilled holes in member 30 may be provided, so that when the members 30 and 35 are engaged as shown in FIG. 5, line c, the predrilled holes are aligned with the pretapped holes. Their positions can be marked on the housing top 12a so that an operator can then easily insert and tighten threaded screws through the two members. This can be done without having to physically see the holes in the extremely small distance, between the ceiling and the suspended housing top 12a.

It should be pointed out that all the above steps can be performed by one operator. All he has to do is cause the rods 30d to become aligned with the opening of slot portions $35d_1$, further raise the unit and then slightly turn the unit to urge the rods 30d into slot portions $35d_2$ (See FIG. 5, line c).

Preferably, each slot 35d, in addition to portions $35d_1$ and $35d_2$ further includes a slot portion $35d_3$ which extends upwardly from the remote end of slot portion $35d_2$. Consequently, after the unit 10 is rotated so that each rod 30d is at the remote end of slot portion $35d_2$, of its associated slot 35d, when the operator lets go of the unit 10, due to its weight and gravity forces, the entire unit moves slightly downwardly, as indicated by arrow 41 in FIG. 5, line d, since the slot portion $35d_3$ enables the unit member 35 to slide down about rod 30d. The unit member 35 slides down, until rod 30d engages the closed end, designated $35d_4$, of slot portion $35d_3$, as shown in FIG. 5, line e. Once, the rod is in this position the unit 10 can no longer move downwardly. Thus, it remains suspended.

Due to the unit's relatively large weight, the rods remain securely positioned within the slots. It should be pointed out that if slot portion $35d_3$ is long enough, even without any other fastening means, the likelihood of accidental detachment of the unit is practically nil. It can only become detached if for some reason, the heavy unit 10 were to rise to the rod-slot position of FIG. 5(c) and the unit were to rotate to align the rod with slot portion $35d_1$. Such unit rising and rotation cannot occur accidentally even with the vibrations of the fan. It can only occur on purpose, requiring an operator to first raise the heavy unit 10 and then rotate it slightly.

The novel attachment arrangement comprised of members 30 and 35, as herebefore described, is more than adequate to attach and suspend a relatively heavy fan-fixture unit substantially flush from the ceiling.

When the two members are engaged, and the unit 10 is finally suspended, the total distance $H_s$ depends on the height of one of the two rims 30b and 35b, and the locations of the rods and slots within the two members. For example, if the height of the rim 30b were made to be 0.75 inch and the slots were shaped in member 35 so that when each rod is in slot position $35d_2$ the housing top practically abuts the lip 30c of member 30, then the height Hs would equal 0.75 inch. If slots 35d with portions $35d_3$ are formed, the total height would equal 0.75 inch plus the length of slot portion $35d_3$ minus the rod diameter. If slot portion $35d_3$ were 0.5 inch, and rod 30d had a diameter of 0.25 inch, $H_s$ would equal $0.75 + 0.5 - 0.25 = 1.00$ inch. When considering mounting a fan-fixture unit with a housing of about 10–12 inches in diameter, any mounting of 2 inches or less from the ceiling can be deemed to be flush mounting.

It is, however, within the contemplation of this invention, as defined in the claims, to include any arrangement as described, and those to be described with a total height Hs which may be greater than 2 inches in the term "flush mounting" or the like.

With the uniquely-shaped slots 35d no additional means are required to suspend and secure the fan-fixture unit 10 substantially flush with the ceiling. However, if desired and as previously explained, pretapped and predrilled holes and appropriate screws may be used to further tighten the rims of the two members to one another.

Also, if desired, slot portion $35d_3$, instead of having its closed end $35d_4$ slightly curving away from the longitudinal axis of slot portion $35d_3$, may be shaped straight, as shown in FIG. 5, line f. To provide additional securing aspects, the width of the slot portion $35d_3$, near the remote end of slot portion $35d_2$ may be made slightly smaller than the diameter of the rod 30d. In such an arrangement, even though the slot width is smaller than the rod diameter, when the operator lets go of the unit when the relative positions of members 30 and 35 are as shown in FIG. 5, line c, due to gravity and the heavy weight of the unit 10, it, with unit member 35, will slide slightly downwardly and the rod 30d will slightly bend the rim material at the reduced width of slot member, designated by $35d_5$ to pass to and engage the closed end $35d_4$. The bent rim matter would act as a spring against the rod. Only a physical force purposely applied upwardly to unit 10 by an operator can cause the unit 10 to be raised so that the rod would pass by the reduced width 35$d_5$.

In the prior description, it was assumed that the base member 35 slides into member 30 with its inwardly directed support rods 30$d$. If desired, the rods may extend outwardly and the unit member 35 may be designed with an ID slightly larger than the OD of member 30, as shown in FIG. 7. To enhance the aesthetic appearance, as well as to further attach the members to one another, decorative lock nuts may be used, such as nut 50 shown in FIG. 7, on threaded ends of the rods.

Furthermore, if desired and as shown in FIG. 8, the arrangement may be designed with the unit member 35 insertable into the ceiling member 30 with the rod members being in the shape of screws 52, which engage the slots below their caps 53.

It should be stressed that the number of support rods 30$d$ must equal the number of slots 35$d$. Also, the rods and slots must be properly spaced, preferably equally, so that when the unit 10 is raised and one member extends into the other, each of the rods is alignable at the mouth or opening of a slot portion of 35$d_1$ of one of the slots 35$d$.

As to the number of support rods (and associated slots) the invention is clearly not intended to be limited to four, as shown in FIG. 3 and 6. If desired, more than four rods can be incorporated, although three are more than adequate. Even a single long rod, extending from one point of the rim 30$b$ to an opposite point and connected thereto so as to effectively bisect the ceiling member 30 into two, can be used. In such an arrangement, the unit member 35 should have two opposite slots to engage the two ends of the single rod. Actually, the single rod can be viewed as two opposite rods which are interconnected.

In all of the foregoing described embodiments, it was assumed that the support rods are incorporated in the ceiling member 30 and the slots are formed in the unit member 35. This was presented for explanatory purposes only. If desired, and as shown in FIG. 9, the novel attachment arrangement may be comprised of ceiling member 30 with slots 60. In such a case, the unit member 35 would incorporate support rods designated by 62. The rods are shown pointing outwardly for the case in which member 35 is slidable within member 30. The rods' ends may be threaded to receive decorative lock nuts 50. If desired, member 30 may be formed to extend into member 35. In such an arrangement, the support rods should extend inwardly.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a ceiling terminal which includes a largely cylindrical ceiling bowl member having a lower rim and fastened close to a ceiling, and a second largely cylindrical bowl member of about the same diameter, and with an upper rim to mate with the ceiling member by one member closely fitting within the other, the improvement wherein:

one bowl member has a plurality of slots spaced about its rim, and the other bowl member has a plurality of projections that pass along said slots when said bowl members mate;

each of said slots has a first portion extending primarily vertically and having an outer end forming an opening in the rim of the slotted member and an inner end spaced from its rim, a second slot portion extending primarily horizontally from said inner end of said first slot portion and said second slot portion having an inner end opposite said first slot portion, and a third slot portion extending in a largely vertical direction from said inner end of said second slot portion and having an inner end furthest from the second slot portion, whereby a workman can install the second bowl member with any electrical device thereon by pressing up the second bowl member until he senses that the projections have reached the inner end of the first slot portions, turning the second member until the projections reach the inner end of the second slot portions, and then releasing the second member to move down slightly to move the projections to the inner ends of the third slot portions.

2. The improvement described in claim 1 wherein: said first slot portion extends substantially vertical and the angle between said first and second slot portions is substantially 90°, and each of said slot portions has substantially parallel sides.

* * * * *